_(12)_ United States Patent
Shirayanagi

(10) Patent No.: US 6,796,653 B2
(45) Date of Patent: Sep. 28, 2004

(54) ASPHERICAL SPECTACLE LENS WITH GEOMETRIC CENTER SPACED FROM FRAMING REFERENCE POINT AND PROCESSING METHOD THEREOF

(75) Inventor: Moriyasu Shirayanagi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 194 days.

(21) Appl. No.: 09/977,233

(22) Filed: Oct. 16, 2001

(65) Prior Publication Data

US 2002/0089642 A1 Jul. 11, 2002

(30) Foreign Application Priority Data

Oct. 17, 2000 (JP) ........................................ 2000-317238

(51) Int. Cl.7 ................................................. G02C 7/02
(52) U.S. Cl. ........................ 351/159; 351/175; 351/177
(58) Field of Search ................................ 351/167, 168, 351/169, 177, 159, 175

(56) References Cited

U.S. PATENT DOCUMENTS 3,960,442 A    6/1976  Davis et al.
4,573,777 A    3/1986  Bristol
6,056,401 A    5/2000  Shirayanagi
6,193,370 B1   2/2001  Shirayanagi

FOREIGN PATENT DOCUMENTS

WO           97/35224           9/1997

*Primary Examiner*—Hung Xuan Dang
(74) *Attorney, Agent, or Firm*—Greenblum & Bernstein, P.L.C.

(57) ABSTRACT

Disclosed are a single-vision aspherical spectacle lens to correct eyesight and a processing method thereof. The spectacle lens has front and back surfaces, one of which is an aspherical surface. A framing reference point that is coincident with a pupil position of a user when the lens is installed on a frame is decentered from a geometrical center of an uncut circular lens (a semifinished lens blank or an uncut finished lens). Further, the symmetric axis of the aspherical surface passes the framing reference point. With this construction, a lens blank of small-size can be employed for manufacturing a spectacle lens for a large-size frame, and the optical performance can be kept high.

11 Claims, 9 Drawing Sheets

ASPHERICAL SPECTACLE LENS WITH GEOMETRIC CENTER SPACED FROM FRAMING REFERENCE POINT AND PROCESSING METHOD THEREOF

BACKGROUND OF THE INVENTION

The present invention relates to a single-vision aspherical spectacle lens to correct eyesight and a processing method thereof.

In general, a spectacle lens is custom-made to meet the customer's specification. However, it takes long time to process both front and back surfaces after receiving the customer's order. Therefore, semifinished lens blanks whose front surfaces are finished are stockpiled and a back surface of the selected semifinished lens blank is processed according to the customer's specification in order to shorten delivery times. The lens whose front and back surfaces are processed is an uncut finished lens. The uncut finished lens is edged according to a shape of a frame to obtain an edged lens.

During the processing of the spectacle lens, it is necessary to define a framing reference point that is a reference point when the lens is installed on a frame. The framing reference point is coincident with a pupil position of a user when the spectacle lens is installed on a frame. The framing reference point is coincident with an optical center and is located on an optical axis when the lens does not include a prism for correcting hereophoria (visual axes are deviated from each other during idle period). Further, when the lens includes the prism, the framing reference point is coincident with a prism reference point at which the design prismatic power is obtained.

A semifinished lens blank 1 has a circular outline shape as shown in FIG. 7. In general, a back surface of the lens blank 1 is processed under the condition where a geometrical center 2 is coincident with the framing reference point 3 to ease the processing. The uncut finished lens is, as shown in FIG. 8, edged according to a shape of a frame to be an edged lens 4. The framing reference point 3, which is coincident with the geometrical center 2, will be in agreement with a pupil position 5 of a user.

However, when the frame size is too large or an interpupillary distance is too short, the framing reference point 3 is largely decentered from a boxing center 4' of the edged lens 4 as shown in FIG. 9. The boxing center 4' is the center of a recrangle that is circumscribed around the edged lens 4. In such a case, when the framing reference point 3 is coincident with the geometrical center 2 of the semifinished lens blank 1 as described above, the planed shape of the edged lens 4 will be protruded from the semifinished lens blank 1, which makes the processing impossible.

Therefore, a decentering processing is known as a prior art to process spherical lenses whose front and back surfaces are spherical. In the decentering processing, the semifinished lens blank 1 is processed under the condition where the framing reference point 3 is decentered from the geometrical center 2 of the semifinished lens blank 1 as shown in FIG. 10. As a result, the planed shape of the edged lens 4 will remain within the semifinished lens blank 1 even if the framing reference point 3 is decentered from the boxing center 4' of the edged lens 4.

During cutting or grinding process in the decentering processing, as shown in FIG. 11, the semifinished lens blank 1 is attached to a blocking jig 6 of a processing device, and a prism spacer 10 having a wedge shape is inserted between the blocking jig 6 and a rotating member (not shown) to incline the front surface 1a of the semifinished lens blank 1. In another example, the semifinished lens blank 1 is attached to the blocking jig 6 such that the geometrical center 2 thereof is decentered from the rotation axis 7 as shown in FIG. 12.

The back surface 1c of the uncut finished lens 1' processed by the decentering processing is shown as broken lines in FIGS. 11 and 12. The framing reference point 3 is decentered from the geometrical center 2 of the uncut finished lens 1'. When the spectacle lens under the processing is a spherical lens, since the optical axis, which is perpendicular to both of the front and back surfaces 1a and 1c of the uncut finished lens 1', intersects the front surface 1a at the framing reference point 3, the optical performance of the decentering lens processed by the decentering processing is equal to that of the non-decentering lens whose framing reference point 3 is coincident with the geometrical center 2 of the uncut finished lens 1'.

On the other hand, when the spectacle lens under the processing is an aspherical lens whose front surface is aspherical, the situation becomes different. As shown in FIG. 13, a semifinished lens blank 11 for an aspherical lens has a front surface 11a that is finished as a rotationally symmetrical aspherical surface and a back surface 11b. The back surface 11b is processed to be a spherical surface or a toric surface to obtain an uncut finished lens. The symmetry axis 12 of the aspherical front surface 11a intersects the front surface 11a at the geometrical center 13 of the semifinished lens blank 11. In order to reduce cost by limiting the number of molding dies, there was no other choice but to conform the symmetry axis 12 to the geometrical center 13.

However, since the above-described conventional aspherical lens is designed to deliver the best optical performance under the condition where the symmetry axis 12 of the aspherical surface 11a intersects the framing reference point 3 that is coincident with the optical center, if the symmetry axis 12 is decentered from the framing reference point 13, the optical performance will be significantly degraded.

Namely, if the conventional semifinished lens blank 11 for the aspherical lens is processed by the decentering processing that is same as for the spherical lens, an uncut finished lens 11' as shown in FIG. 14 will be formed. Since the optical axis 16 that is perpendicular to both of the front and back surfaces 11a and 11c of the uncut finished lens 11' and intersects the framing reference point 15 will be decentered from the symmetric axis 12 that intersects the geometrical center 13 of the uncut finished lens 11', the optical performance will be significantly degraded.

FIGS. 15 and 16 are graphs showing average refractive power error and astigmatism within 50 degrees of visual angle, respectively, of the conventional aspherical lens whose framing reference point 15 is located on the symmetric axis 12 of the aspherical surface 11a. On the other hand, FIGS. 17 and 18 are similar graphs of the aspherical lens whose framing reference point 15 is decentered from the symmetric axis 12 as shown in FIG. 14. Analysis of these graphs shows that the decentering processing is virtually impossible because of the large aberrations.

Accordingly, the conventional aspherical lens employed for a large-size frame cannot be processed by the decentering processing, which requires a lens blank of large size.

SUMMARY OF THE INVENTION

It is therefore an object of the present invention to provide an aspherical spectacle lens, which is capable of using a lens blank of small size even if a lens is employed for a large-size frame and is capable of keeping high optical performance. A further object of the present invention is to provide the processing method of the above aspherical spectacle lens.

For the above object, according to the present invention, there is provided an improved single-vision aspherical spectacle lens to correct eyesight, which includes:

a front surface; and a back surface, wherein at least one of the front and back surface is aspherical, a framing reference point that is coincident with a pupil position of a user when the lens is installed on a frame is decentered from a geometrical center of an uncut circular lens (a semifinished lens blank or an uncut finished lens).

With this construction, a lens blank of small-size can be employed for manufacturing a spectacle lens for a large-size frame by deviating the framing reference point from the geometrical center of the lens blank. Further, when the symmetric axis of the aspherical surface intersects the aspherical surface at the framing reference point, the optical performance can be kept high.

In the case when a semifinished lens blank whose front surface is finished is employed, it is desirable that the front surface is spherical and the back surface is processed as an aspherical surface according to a required specification.

The aspherical surface may be a rotationally-symmetrical surface when the lens does not include a cylindrical power to correct astigmatism of an eye. When a cylindrical power is required, the aspherical surface may be symmetric with a pair of planes of symmetry that are perpendicular to each other. The symmetric axis for the rotationally-symmetrical surface is a rotation axis, and that for the surface symmetric with a pair of planes of symmetry is an intersection line of the planes.

Further, the processing method according to the present invention comprises:

attaching a semifinished lens blank whose front surface is finished to an NC machine tool; and cutting or grinding a back surface of the semifinished lens blank to be an aspherical surface, wherein the semifinished lens blank is attached to the NC machine tool such that the front surface is not inclined with respect to the machine coordinate of the NC machine tool.

With the above method, an operator is able to attach the semifinished lens blank to the NC machine tool in the same manner as a normal lens whose framing reference point is coincident with the geometrical center without any confusion. Further, when an NC lathe is used to process the back surface, it is desirable to rotate the semifinished lens blank about an axis that intersects the geometrical center during the processing in order to stabilize the rotation torque. Since the front surface is not inclined with respect to the machine coordinate, the target shape of the back surface should be inclined with respect to the machine coordinate for the decentering processing. Thus, the processing method is desirable to include a step for transforming the target shape of the back surface defined in the predetermined coordinate system to that in the machine coordinate thereby creating NC data for the NC machine tool.

DESCRIPTION OF THE ACCOMPANYING DRAWINGS

Figure 17:
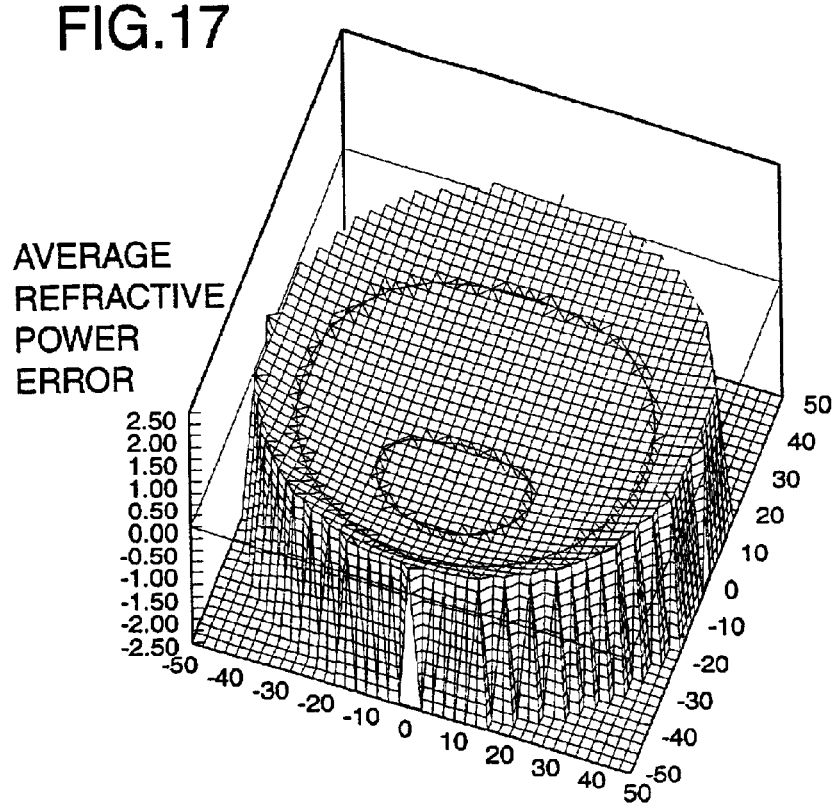
Figure 18:
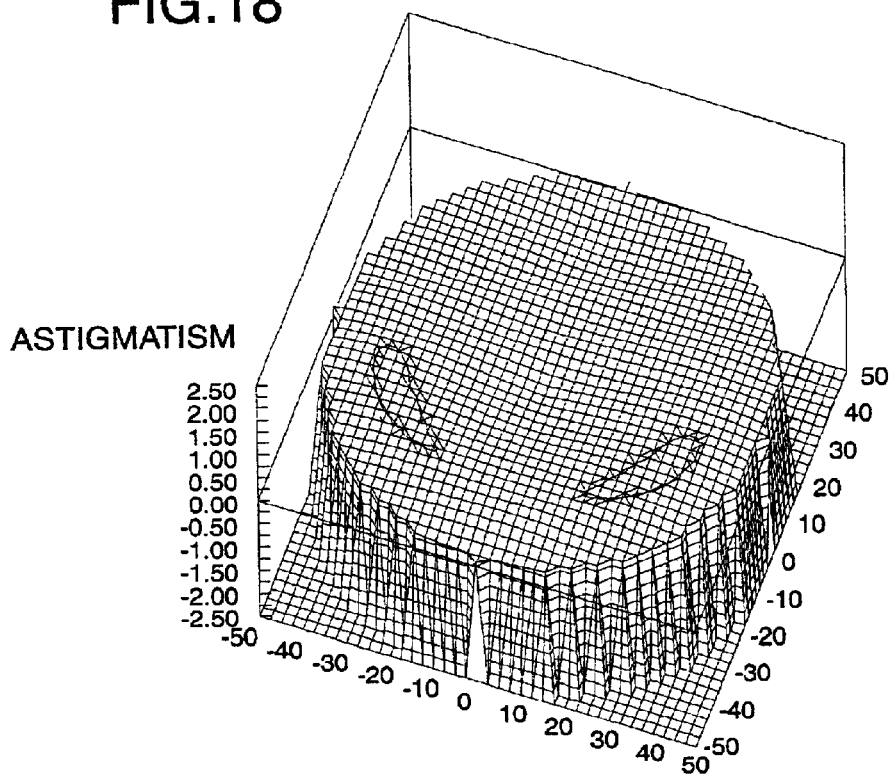

FIG. 17 is a graph showing average refractive power error of an aspherical lens whose front surface is aspherical and the framing reference point thereof is decentered from the symmetric axis of the aspherical surface; and FIG. 18 is a graph showing astigmatism of the conventional aspherical lens whose front surface is aspherical and the framing reference point thereof is decentered from the symmetric axis of the aspherical surface.

DESCRIPTION OF THE EMBODIMENTS

A single-vision aspherical spectacle lens embodying the present invention and a processing method thereof will be described hereinafter.

First Embodiment

Figure 1:
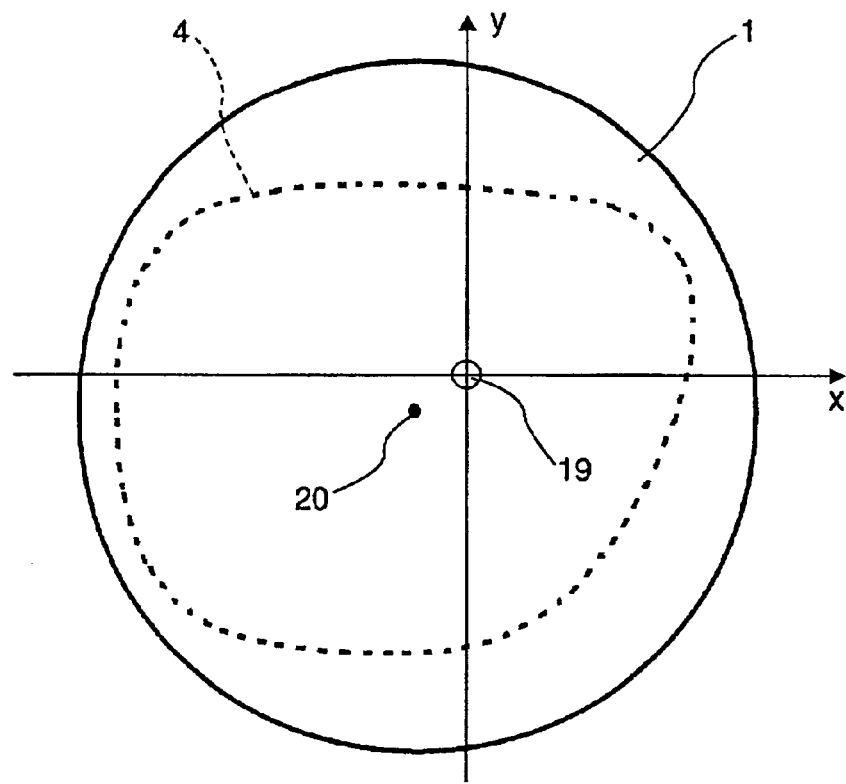
FIG. 1 is a plan view of a semifinished lens blank according to a first embodiment.
Figure 2:
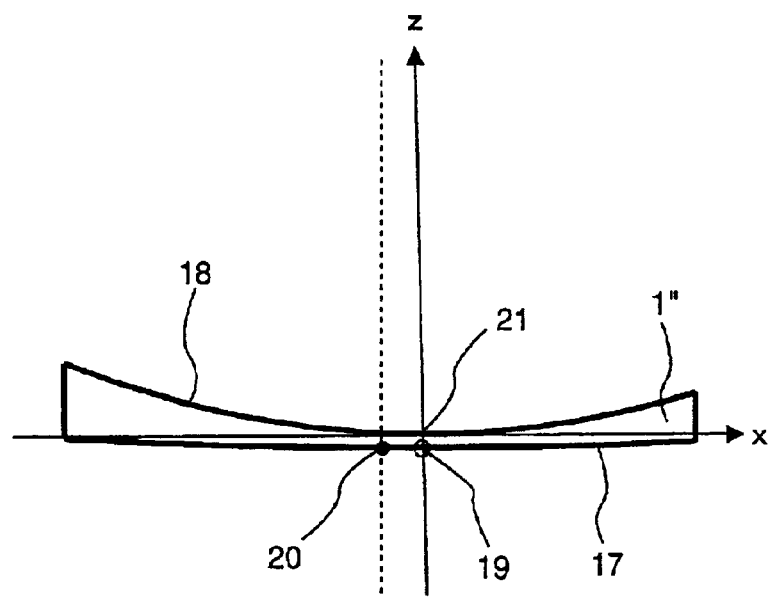
FIG. 2 is a sectional view of an uncut finished lens according to the first embodiment.

FIGS. 1 and 2 show an aspherical spectacle lens according to a first embodiment, FIG. 1 is a plan view of a semifinished lens blank 1 and FIG. 2 is a sectional view of an uncut finished lens that is made by cutting the semifinished lens blank 1.

The target of the first embodiment is a decentering aspherical spectacle lens whose spherical power is −4.00 Diopter without prismatic power and cylindrical power. The refractive index of the lens material is 1.67, a diameter is φ70 mm, a center thickness is 1.1 mm, a front surface 17 is a spherical surface whose radius of curvature is 742.2 mm, and the back surface 18 is a rotationally-symmetrical aspherical surface.

In the drawings, an x-y-z coordinate system is set for defining the back surface 18. The z-axis is the symmetric axis of the aspherical surface, which is the rotation symmetric axis of the target shape of the back surface 18. The x- and y-axes intersect at a right angle in a plane that contacts the vertex 21 of the target shape of the back surface 18 and is perpendicular to the z-axis.

On the spectacle lens, a framing reference point 19 is defined to be coincident with a pupil position of a user when the spectacle lens is installed on a frame. The framing reference point 19 is coincident with an optical center and is located on an optical axis in the first embodiment because the lens does not include prism for correcting heterophoria.

The framing reference point 19 is decentered from a geometrical center 20 of the semifinished lens blank 1, which is the same as the geometrical center of the uncut finished lens 1" as shown in FIG. 2. Further, as shown in FIG. 2, the framing reference point 19 is located on the z-axis that is the symmetric axis of the aspherical back surface 18.

The decentering amount of the framing reference point 19 from the geometrical center 20 is 3.6 mm in the nose-side (+x direction) and 3.1 mm in the upward (+y direction). The distance between the two points 19 and 20 is 4.75 mm.

The back surface 18 is expressed by the following equations:

$$h = \sqrt{x^2 + y^2}$$

$$z(h) = \frac{C \cdot h^2}{1 + \sqrt{1 - (\kappa + 1) \cdot C^2 \cdot h^2}} + \sum A_j \cdot h^j$$

z(h) is a sag, that is, a distance between a point on the back surface 18 and a point on the x-y plane where the height from the vertex 21 is h. Symbol c is a curvature (1/R) at the vertex 21 of the back surface 18, κ is a conic constant, and $A_j$ is an aspherical surface coefficient of j-th order.

TABLE 1 shows the values of the paraxial radius of curvature R, the conic constant κ, the aspherical surface coefficients $A_j$ (j=4, 6, 8 and 10 in this embodiment).

TABLE 1

| R | 742.200 [mm] |
| κ | 0.000 |
| $A_4$ | $-5.185 \times 10^{-7}$ |
| $A_6$ | $2.307 \times 10^{-10}$ |
| $A_8$ | $-8.384 \times 10^{-14}$ |
| $A_{10}$ | $1.590 \times 10^{-17}$ |

The aspherical spectacle lens of the first embodiment is manufactured according to the following steps.

First step: Preparing a plurality of semifinished lens blanks 1 whose front surface is finished to be spherical.

Second step: Selecting one of the semifinished lens blanks 1 according to the required specification.

Third step: Cutting or grinding the back surface of the semifinished lens blank with an NC machine tool.

Figure 3:
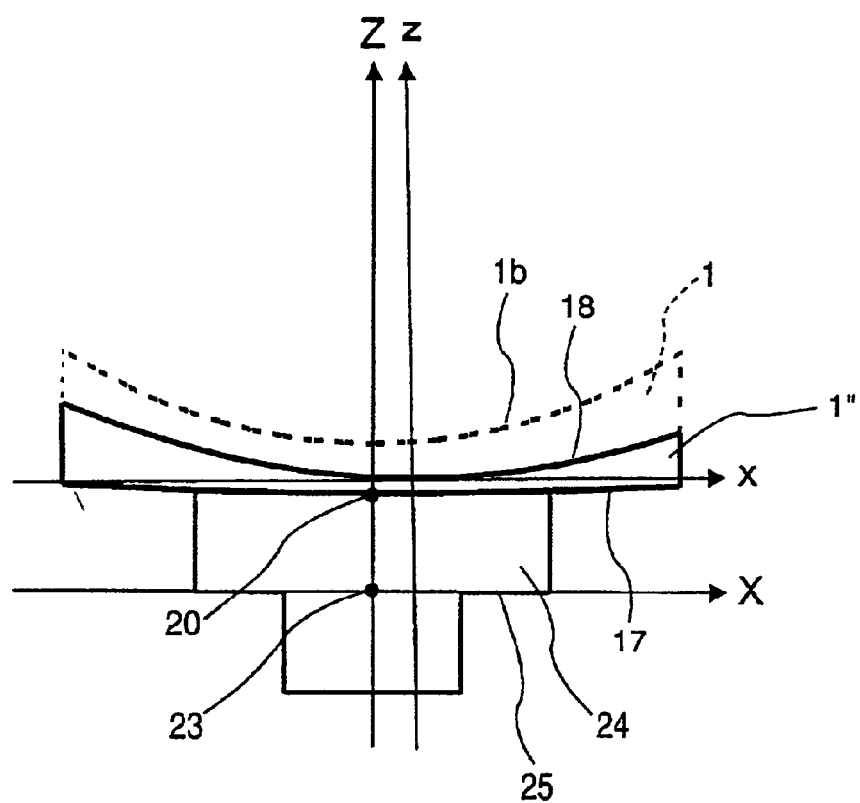
FIG. 3 is a sectional view of the uncut finished lens according to the first embodiment that is attached to a blocking jig.
Figure 4:
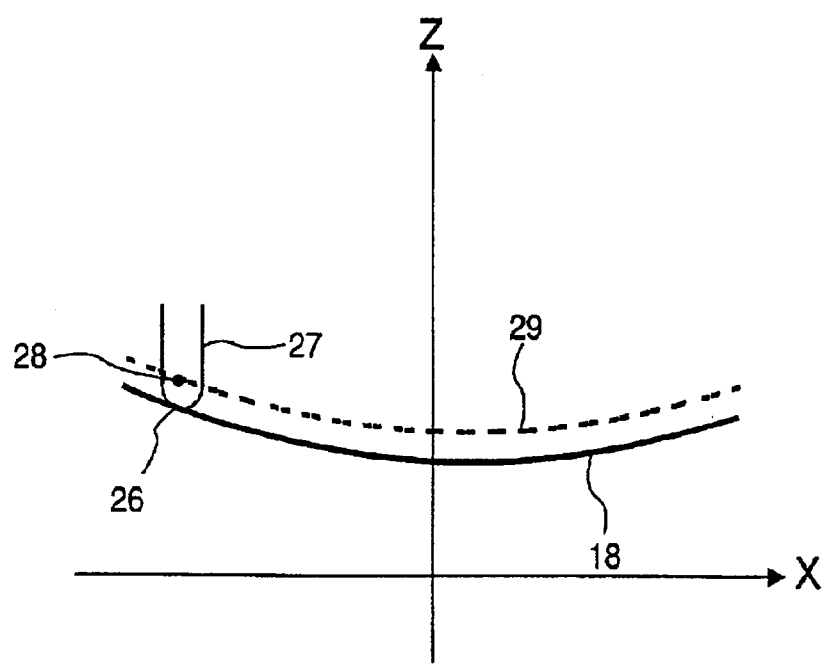
FIG. 4 show a locus of a cutting tool with the target shape of the back surface according to the first embodiment.

When the back surface 1b of the semifinished lens blank 1 is processed, the semifinished lens blank 1 is attached to the blocking jig 24 of the NC machine tool as shown in FIG. 3. And then, the back surface 1b is cut with a cutting tool or an end mill while rotating the blocking jig 24.

An X-Y-Z coordinate system is defined as the machine coordinate. The Z-axis is a rotation axis of the blocking jig 24, the X- and Y-axes intersect at right angle in an attachment plane 25 that is perpendicular to the Z-axis. The origin 23 of the X-Y-Z coordinate system is the center of the attachment plane 25. The semifinished lens blank 1 is attached to the blocking jig 24 such that the front surface 17 of the lens blank 1 is not inclined with respect to the machine coordinate X-Y-Z and the geometrical center 20 is located on the Z-axis.

Accordingly, the coordinate system x-y-z to define the back surface 18 is shifted with respect to the machine coordinate system X-Y-Z. It is necessary to transform the shape of the back surface 18 defined in the x-y-z coordinate system to the machine coordinate X-Y-Z for producing processing data of the NC machine tool. The coordinate transformation is expressed by the following equation:

$$\begin{bmatrix} X \\ Y \\ Z \end{bmatrix} = \begin{bmatrix} T_{11} & T_{12} & T_{13} \\ T_{21} & T_{22} & T_{23} \\ T_{31} & T_{32} & T_{33} \end{bmatrix} \cdot \begin{bmatrix} x \\ y \\ z \end{bmatrix} + \begin{bmatrix} \Delta X \\ \Delta Y \\ \Delta Z \end{bmatrix}$$

Values of $T_{ij}$ of the transformation matrix in the first embodiment are shown in TABLE 2.

TABLE 2

| $T_{ij}$ | j = 1 | j = 2 | j = 3 |
| --- | --- | --- | --- |
| i = 1 | 0.99999 | −0.00002 | 0.00485 |
| i = 2 | 0.00000 | 0.99999 | 0.00418 |
| i = 3 | −0.00485 | −0.00418 | 0.99998 |
| ΔX | 3.595 | — | — |
| ΔY | 3.095 | — | — |
| ΔZ | 5.238 | — | — |

The NC machine tool controls the cutting tool 27 such that the center 28 of edge of the cutting tool 27 moves along a virtual surface 29 that is spaced from the target back surface 18. The distance between the target back surface 18 and the virtual surface 29 in a direction normal to the target back surface 18, which is a distance between the center 28 and the tangent point 26 of the cutting tool 27 to the target back surface 18, is equal to a radius of the cutting edge of the cutting tool 27. Thereby the back surface 18 is processed to be a desired aspherical shape.

On the transformed machine coordinate X-Y-Z, assuming that the target back surface 18 is represented by the function Z(X, Y), elements of the normal vector of surface (Ex,Ey,Ez) are given as follows:

$$Ez = \frac{1}{\sqrt{1 + \left(\frac{\partial Z}{\partial X}\right)^2 + \left(\frac{\partial Z}{\partial Y}\right)^2}}$$

$$Ex = -\frac{\partial Z}{\partial X} \cdot Ez$$

$$Ey = -\frac{\partial Z}{\partial Y} \cdot Ez$$

Further, elements of the coordinate (Xt,Yt,Zt) of the center 28 of the cutting edge of the cutting tool 27 are given as follows when the radius of the cutting edge is Rt:

$$Xt = X + Rt \cdot Ex$$

$$Yt = Y + Rt \cdot Ey$$

$$Zt = Z + Rt \cdot Ez$$

As shown in FIG. 3, since the semifinished lens blank 1 is attached to the blocking jig 24 such that the geometrical center 20 is located on the rotation axis (Z-axis) without inclination, an operation to attach the lens blank 1 to the jig 24 is not difficult, it is suitable to an automatic manufacturing line. Further, the rotation torque becomes constant, which stabilizes the semifinished lens blank under the processing, enabling more precies aspherical surface processing as compared with the conventional decentering processing where the geometrical center is decentered from the rotation axis.

The back surface 18 that has been cut or ground with the NC machine tool is polished by copy polishing to be a specular surface. And then the uncut finished lens is edged according to the shape of the frame as shown by a broken line in FIG. 1 to be an edged lens 4.

Second Embodiment

Figure 5:
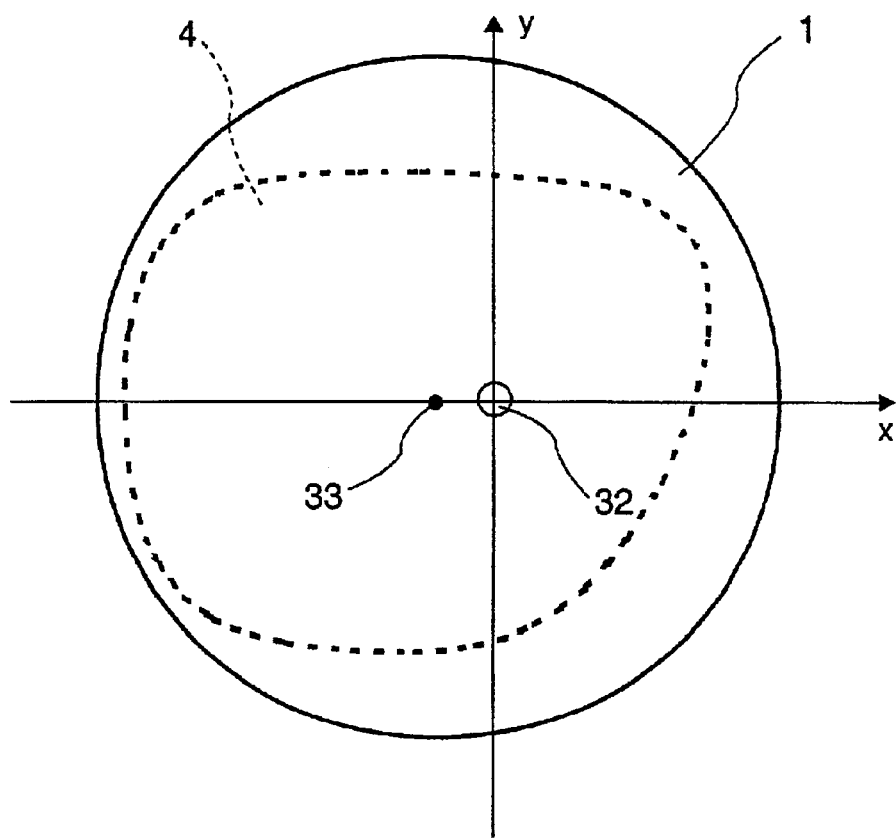
FIG. 5 is a plan view of a semifinished lens blank according to a second embodiment.
Figure 6:
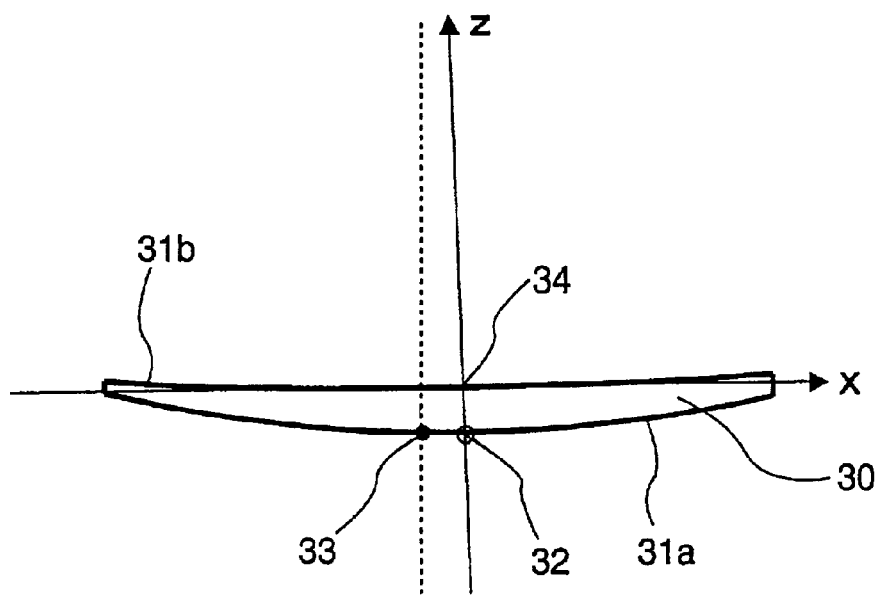
FIG. 6 is a sectional view of an uncut finished lens according to the second embodiment.
Figure 7:
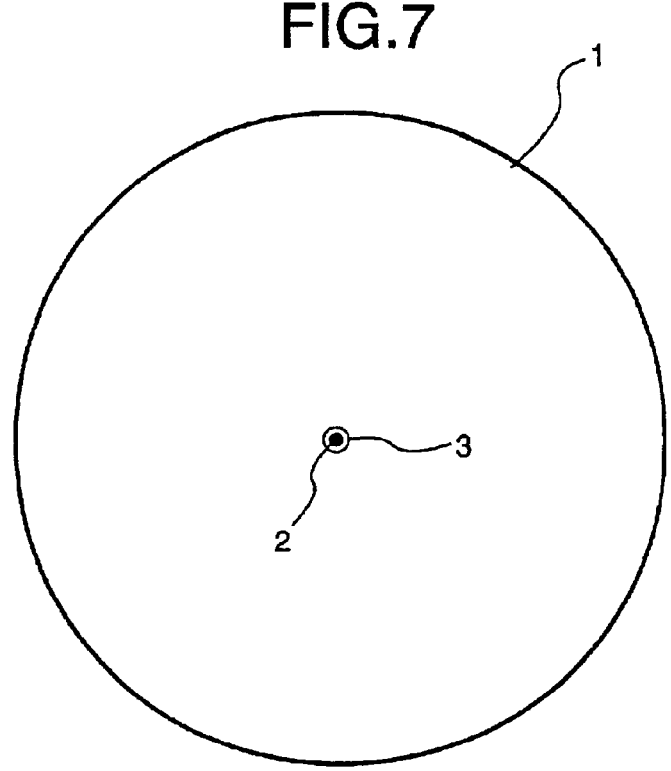
FIG. 7 is a plan view of a conventional semifinished lens blank whose framing reference point is coincident with a geometrical center thereof.
Figure 8:
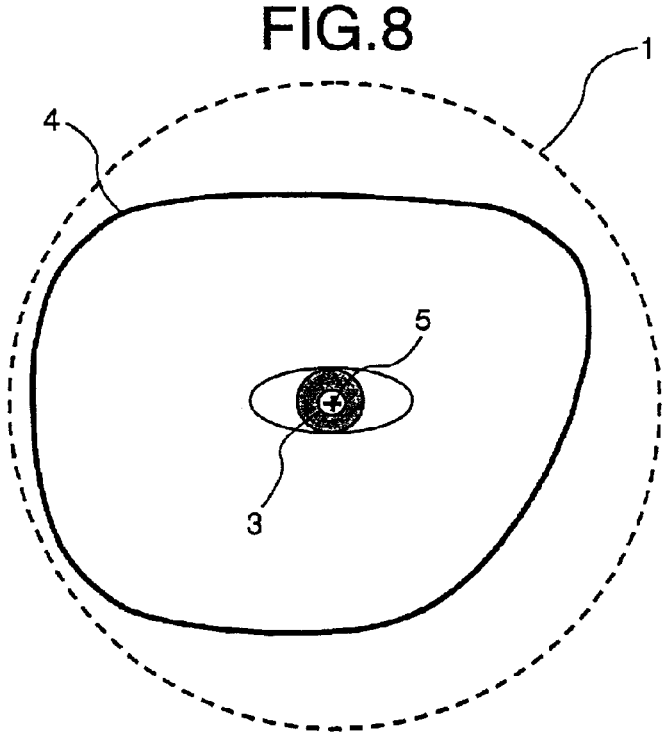
FIG. 8 is a plan view of a lens made by processing and then edging the semifinished lens blank shown in FIG. 7.
Figure 9:
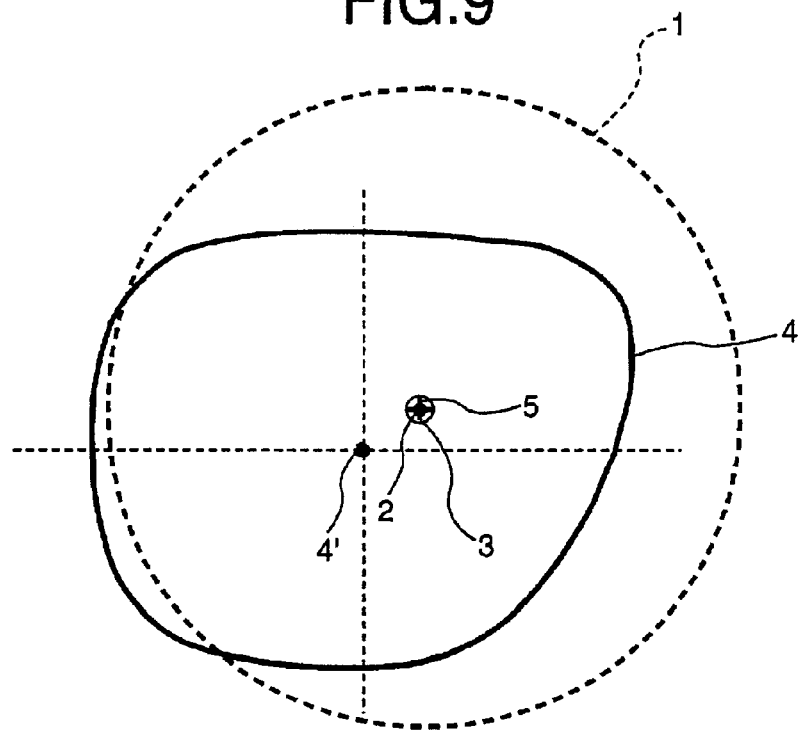
FIG. 9 shows a target shape of an edged lens whose periphery portion exceeds the semifinished lens blank.
Figure 10:
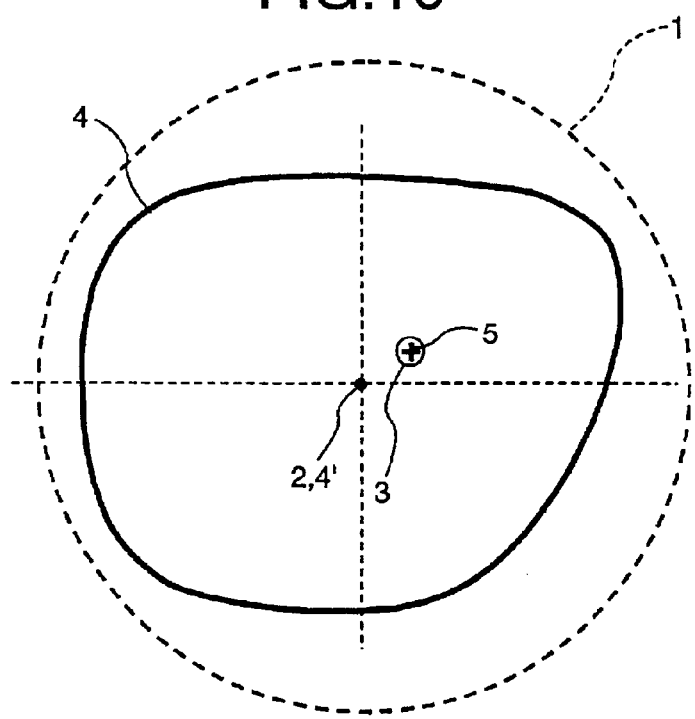
FIG. 10 is a plan view of a conventional spectacle lens processed by the decentering processing.
Figure 11:
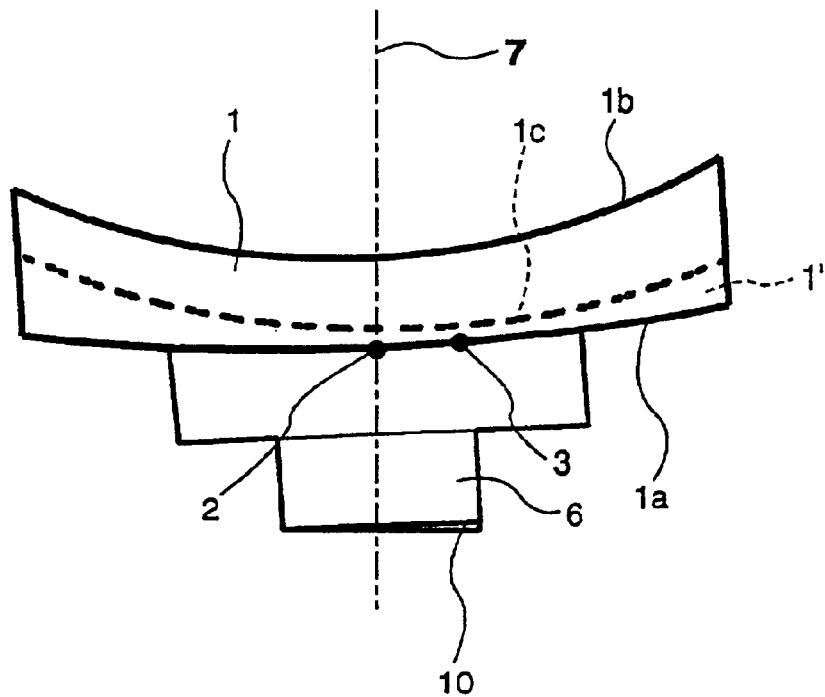
FIG. 11 shows a semifinished lens blank attached to a blocking jig with a spacer.
Figure 12:
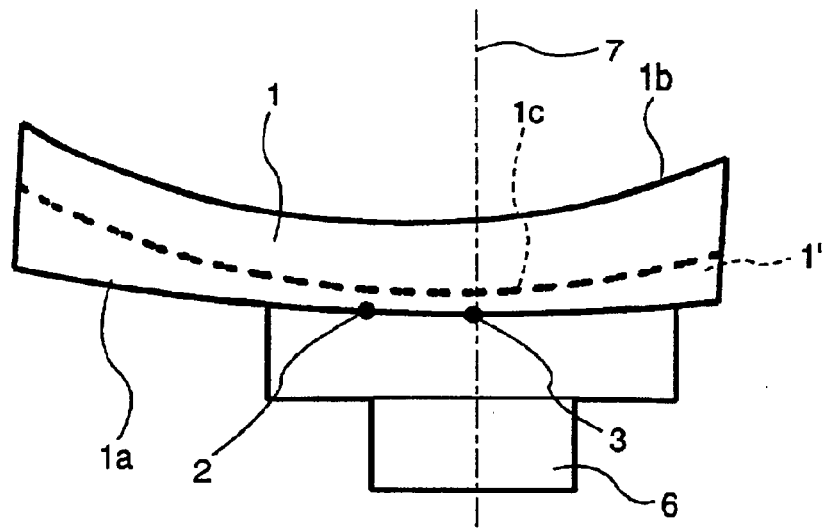
FIG. 12 shows a semifinished lens blank attached to a blocking jig for decentering processing.
Figure 13:
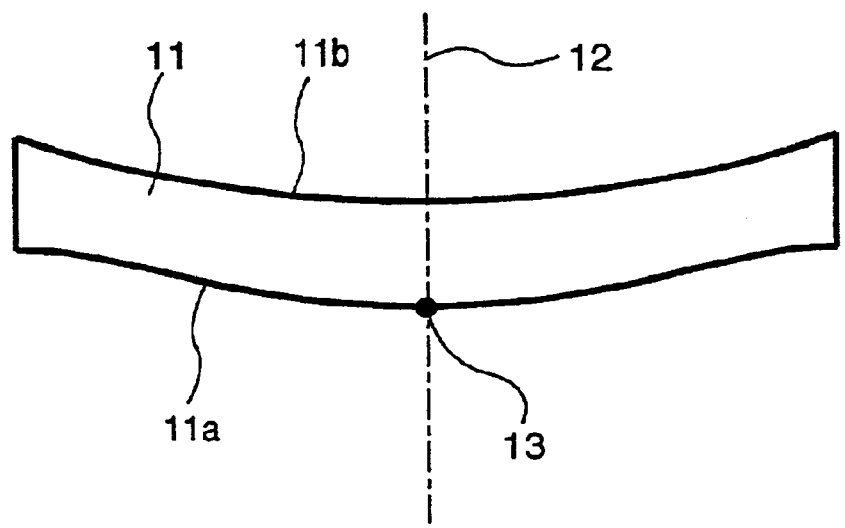
FIG. 13 is a sectional view of a semifinished lens blank for a conventional aspherical spectacle lens.
Figure 14:
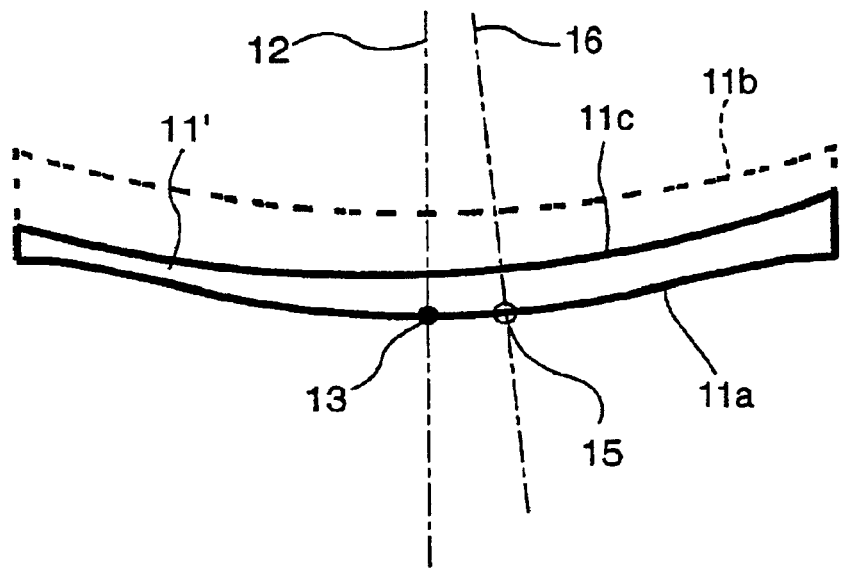
FIG. 14 is a sectional view of an uncut finished lens made by cutting the semifinished lens blank shown in FIG. 13 by the decentering processing.
Figure 15:
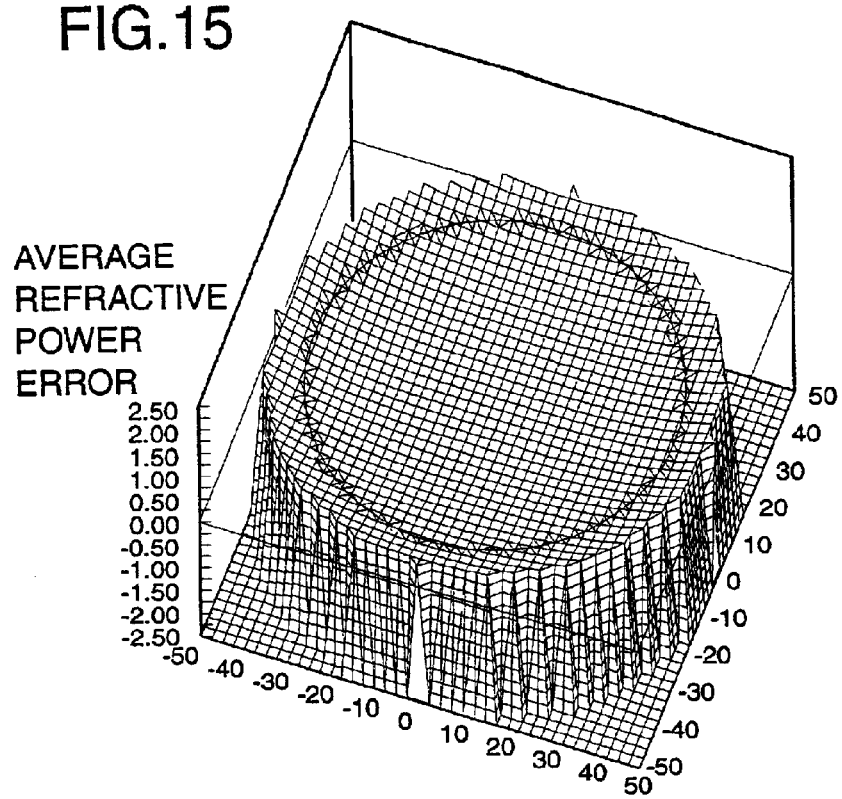
FIG. 15 is a graph showing average refractive power error of the conventional aspherical lens whose front surface is aspherical and the framing reference point thereof is located on the symmetric axis of the aspherical surface.
Figure 16:
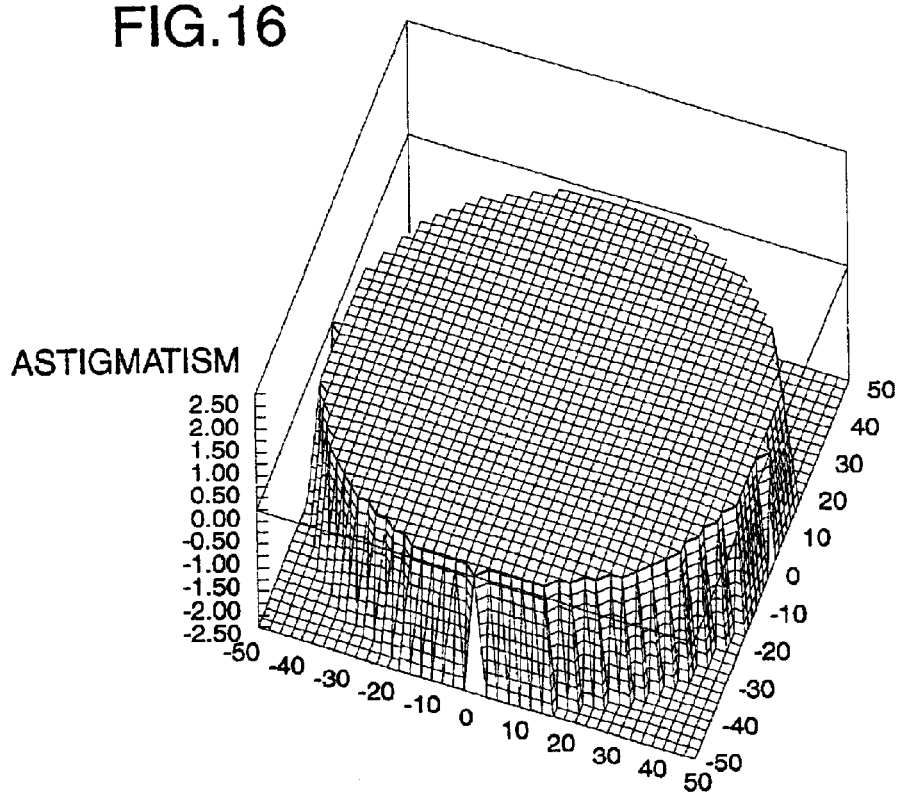
FIG. 16 is a graph showing astigmatism of the the conventional aspherical lens whose front surface is aspherical and the framing reference point thereof is located on the symmetric axis of the aspherical surface.

FIGS. 5 and 6 show an aspherical spectacle lens according to a second embodiment, FIG. 5 is a plan view of a semifinished lens blank 1 and FIG. 6 is a sectional view of an uncut finished lens 30 that is made by cutting the semifinished lens blank 1.

The target of the second embodiment is a decentering aspherical spectacle lens whose spherical power is +2.00 Diopter, cylindrical power is +2.00 Diopter and a cylinder axis is 90 degrees without prismatic power. The refractive index of the lens material is 1.67, a diameter is ϕ65 mm, a center thickness is 4.3 mm, a front surface 31a is a spherical surface whose radius of curvature is 143.6 mm, and the back surface 31b is a rotationally-asymmetrical aspherical surface that is defined by a two dimensional polynomial expression.

In the same manner as the first embodiment, an x-y-z coordinate system is set for defining the back surface 31b. The origin of the x-y-z coordinate system is the vertex 34 of the back surface 31b. Since the back surface 31b has the cylindrical power, it is symmetric with a pair of planes of symmetry. The z-axis, which is the symmetric axis, is an intersection line of these planes.

The framing reference point 32 is, as shown in FIG. 5, decentered from the geometrical center 33 and is located on the z-axis as shown in FIG. 6. The decentering amount of the framing reference point 32 from the geometrical center 33 is 3.0 mm in the nose side.

The back surface 31b is a rotationally-asymmetrical aspherical surface that is defined by a two dimensional polynomial expression as follows:

$$Z = \sum_i \sum_j B_{ij} \cdot x^i \cdot y^j$$

where z is a sag, that is, a distance between a point (x, y, 0) on a tangent plane at the vertex 34 and a point (x, y, z) on the back surface 31b in the direction of z-axis, and $B_{ij}$ are aspherical coefficients. The back surface 31b is symmetric with the x-z plane and the y-z plane. The values of the aspherical coefficients $B_{ij}$ (i=2,4,6,8; j=0,2,4,6,8 in this embodiment) are shown in TABLE 3.

The aspherical spectacle lens of the second embodiment is manufactured in the same manner as the first embodiment. Namely, a semifinished lens blank 1 whose front surface is finished as a spherical surface is attached to the blocking jig and then the back surface of the lens blank 1 is cut or ground with the NC machine tool.

When the machine coordinate system X-Y-Z whose origin is the center of the attachment surface is defined in the same manner as the first embodiment, the shape of the back surface 31b defined in the x-y-z coordinate system can be transformed to the machine coordinate system X-Y-Z with the coordinate transformation with the coordinate transformation expressed by the equation described above. Values of $T_{ij}$ of the transformation matrix in the second embodiment are shown in TABLE 4.

TABLE 4

| $T_{ij}$ | j = 1 | j = 2 | j = 3 |
|---|---|---|---|
| i = 1 | 0.99978 | 0.00000 | 0.02089 |
| i = 2 | 0.00000 | 1.00000 | 0.00000 |
| i = 3 | −0.02089 | 0.00000 | 0.99978 |
| ΔX | 2.910 | — | — |
| ΔY | 0.000 | — | — |
| ΔZ | 11.362 | — | — |

The NC machine tool controls the cutting tool such that the center of edge of the cutting tool moves along a virtual surface that is shifted from the target back surface 31 by the distance that is equal to the radius of the cutting tool.

As described above, according to the present invention, it is able to provide an aspherical spectacle lens that keeps high optical performance even if the lens is processed by the decentering processing. Therefore, a small-size lens blank can be employed for manufacturing a spectacle lens for a large-size frame.

Further, it is desirable that a front surface of the semifinished lens blank is a spherical surface and a back surface is processed according to a specification of a user. In such a case, the semifinished lens blank requires spherical surface processing only, which eases the manufacturing and the management of the semifinished lens blanks.

Still further, when the semifinished lens blank is attached to the NC machine tool without inclination with respect to the machine coordinate, which discontinues use of the prism spacer to tilt the blocking jig and the decentering blocking, enabling a easy operation of the blocking and a stable processing. As a result, a precise aspherical surface can be obtained and it is suitable to an automatic manufacturing line.

The present disclosure relates to the subject matter contained in Japanese Patent Application No. 2000-317238, filed on Oct. 17, 2000, which is expressly incorporated herein by reference in its entirety.

What is claimed is:

1. A single-vision aspherical spectacle lens to correct eyesight comprising:

TABLE 3

| $B_{ij}$ | j = 0 | j = 2 | j = 4 | j = 6 | j = 8 |
|---|---|---|---|---|---|
| i = 0 | 0.000 | −2.024 × 10⁻⁰³ | −2.007 × 10⁻⁰⁷ | 8.898 × 10⁻¹¹ | −1.784 × 10⁻¹⁴ |
| i = 2 | −5.257 × 10⁻⁰⁴ | −7.266 × 10⁻⁰⁷ | 4.121 × 10⁻¹⁰ | −1.011 × 10⁻¹³ | — |
| i = 4 | −5.351 × 10⁻⁰⁷ | 5.556 × 10⁻¹⁰ | −1.942 × 10⁻¹³ | — | — |
| i = 6 | 2.357 × 10⁻¹⁰ | −1.595 × 10⁻¹³ | — | — | — |
| i = 8 | −4.772 × 10⁻¹⁴ | — | — | — | — | a front surface; and a back surface, wherein at least one of said front and back surfaces is aspherical, a framing reference point that is coincident with a pupil position of a user when the lens is installed on a frame is decentered from a geometrical center of an uncut circular lens.

2. The single-vision aspherical spectacle lens according to claim 1, wherein said aspherical surface has a symmetric axis that intersects said framing reference point.

3. The single-vision aspherical spectacle lens according to claim 2, wherein said back surface is a rotationally symmetrical aspherical surface and said symmetric axis is a rotational symmetry axis of said aspherical surface.

4. The single-vision aspherical spectacle lens according to claim 2, wherein said back surface is symmetric with a pair of planes of symmetry that are perpendicular to each other, and said symmetric axis is an intersection line of said planes.

5. The single-vision aspherical spectacle lens according to claim 1, wherein said front surface is spherical and said back surface is aspherical.

6. The single-vision aspherical spectacle lens according to claim 1, wherein said framing reference point is coincident with the optical center of the lens.

7. The single-vision aspherical spectacle lens according to claim 1, wherein the framing reference point is located on a symmetric axis of an aspherical surface of the lens.

8. A processing method of an aspherical spectacle lens comprising:

attaching a semifinished lens blank whose front surface is finished to an NC machine tool; and one of cutting and grinding a back surface of the semifinished lens blank to be an aspherical surface, wherein the semifinished lens blank is attached to the NC machine tool such that the front surface is not inclined with respect to a machine coordinate of the NC machine tool.

9. The processing method according to claim 8, wherein the back surface is processed while the semifinished lens blank is rotated about an axis that intersects a geometrical center of the seimfinished lens blank.

10. The processing method according to claim 8, further including transforming the target shape of the back surface defined in the predetermined coordinate system to that in the machine coordinate thereby creating NC data for the NC machine tool.

11. The processing method according to claim 8, wherein a geometrical center of the semifinished lens blank is located on a rotation axis of the blocking jig of the machine tool.

* * * * *